US009582291B2

(12) United States Patent
Suzumura et al.

(10) Patent No.: US 9,582,291 B2
(45) Date of Patent: Feb. 28, 2017

(54) SELECTING A MAPPING THAT MINIMIZES CONVERSION COSTS

(75) Inventors: Toyotaro Suzumura, Tokyo (JP);
Michiaki Tatsubori, Kanagawa-ken (JP); Akihiko Tozawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/565,897

(22) Filed: Sep. 24, 2009

(65) Prior Publication Data

US 2010/0107059 A1    Apr. 29, 2010

(30) Foreign Application Priority Data

Sep. 25, 2008  (JP) .................. 2008-245866

(51) Int. Cl.
*G06F 17/22* (2006.01)
*G06F 9/44* (2006.01)

(52) U.S. Cl.
CPC ............ *G06F 9/4435* (2013.01); *G06F 17/22* (2013.01)

(58) Field of Classification Search
CPC ...................................................... G06F 17/22
USPC ........................................ 715/239; 707/797
See application file for complete search history.

(56) References Cited

U.S. PATENT DOCUMENTS 5,963,966 A * 10/1999 Mitchell et al. ............. 715/236
7,805,474 B2 * 9/2010 Warshavsky et al. ....... 715/239
2004/0168124 A1 * 8/2004 Beisiegel et al. ............ 715/513
2004/0205552 A1 * 10/2004 Vosburgh ..................... 715/513

FOREIGN PATENT DOCUMENTS

JP          2002215403        8/2002
JP          2003256455 A      9/2003

OTHER PUBLICATIONS

Le Hors, A., et al., "W3C Recommendation: Document Object Model (DOM) Level 3 Core Specification", Apr. 7, 2004. (98 Pages) <URL:http://www.w3.org/TR/DOM-Level-3-Core/>, [searched Sep. 10, 2008].
Oracle Corporation, "JSR 222: Java Architecture for XML Binding (JAXB) 2.0", Java Community Process, (7 Pages) <URL:http://jcp.org/en/jsr/detail?id=222> [searched Sep. 10, 2008].

(Continued)

*Primary Examiner* — Kavita Padmanabhan
*Assistant Examiner* — Tionna Burke
(74) *Attorney, Agent, or Firm* — Tutunjian & Bitetto, P.C.; Jennifer R. Davis

(57) ABSTRACT

A generation apparatus that generates a mapping between individual properties included in an object in a program and individual elements of a structured document. The generation apparatus includes: an object tree generation unit that generates a tree structure representing hierarchical structure of the object by assigning the individual properties included in the object to nodes of the tree structure; and a selection unit that selects a mapping minimizing conversion cost of converting the tree structure of the object to a tree structure that includes the individual elements of the structured document as its nodes. The selection is from mappings that associate the individual properties included in the object with the individual elements of the structured document.

13 Claims, 12 Drawing Sheets

(56) References Cited

OTHER PUBLICATIONS

Gignoux, S., et al., "Castor XML Mapping", ExoLab Group, Intalio Inc., (28 Pages) <URL:http://www.castor.org/xml-mapping.html> [searched Sep. 10, 2008].

Sosnoski Software Solutions, Inc., "JiBX: Binding XML to Java Code", (3 Pages) <URL:http://jibx.sourceforge.net/> [searched Sep. 10, 2008].

Bille, P., "A survey on tree edit distance and related problems", Jun. 2005, pp. 1-27. <URL:http://portal.acm.org/citation.cfm?id=1085283> [searched Sep. 10, 2008].

Kuboyama, et al., "Approximate Tree Matching and Merging for Integrating Semistructured Data", Information Processing Society of Japan Research Reports, Japan, Information Processing Society of Japan, May 2005, pp. 47-54 vol. 2005, No. 42.

Kuboyama, et al., "Kernel Design for Semistructured Data Based on Counting Common Subtree Patterns", DEWS 2006 Papers [online], Japan, The Institute of Electronics, Information and Communication Engineers (IEICE), Engineering Research Expert Committee, Jun. 2006, 13 Pages.

\* cited by examiner

FIG. 4

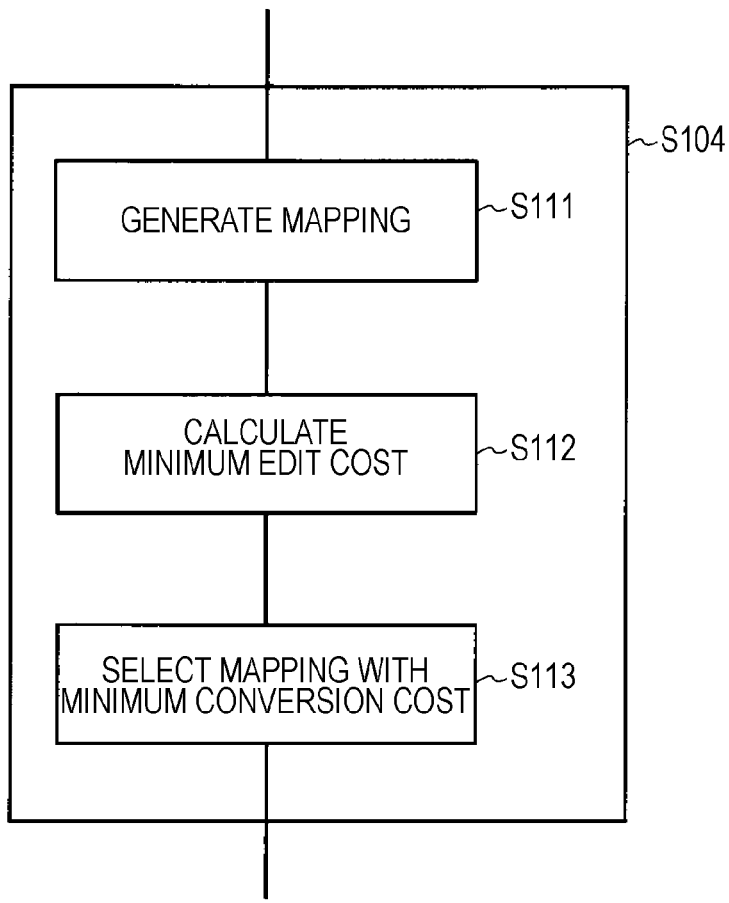

- GENERATE MAPPING — S111
- CALCULATE MINIMUM EDIT COST — S112
- SELECT MAPPING WITH MINIMUM CONVERSION COST — S113

S104

FIG. 5
```
$client=new AgileSoapClient("employee.wsdl");
$person['name']='Tatsubori';
$person['firstname']='Michiaki';
$person['age']=33;
$client->publishEmployee($person);
```

FIG. 6
```
<anonymous>
    <name>Tatsubori</name>
    <first-name>Michiaki</first-name>
    <age>33</age>
</anonymous>
```

FIG. 8

```
<wsdl:message name="publishEmployeeServiceRequest">
  <wsdl:part name="employee" element="Employee">
    <wsdl:documentation>Publish employee data</wsdl:documentation>
  </wsdl:part>
</wsdl:message>
...
<wsdl:binding...>
  <soap:binding.../>
  <wsdl:operation name="publishEmlployee">
    <soap:operation style="document"/>
    <wsdl:input name="employee">
      <soap:body use="literal"/>
    </wsdl:input>
    ...
  </wsdl:operation>
</wsdl:binding>
```

FIG. 9

```xml
<?xml version="1.0"encoding="UTF-8"?>
<schema elementFormDefault="qualified"
   xmlns:xsd="http://www.w3.org/2001/XMLSchema"
   xmlns="http://www.w3.org/2001/XMLSchema">
<elememt name="Employee">
   <complexType>
     <sequence>

<elememt name="person"minOccurs="0">
     <complexType>
        <sequence>

<elememt name="name"minOccurs="1"maxOccurs="1">
        <complexType>
          <sequence>

<elememt minOccurs="1"maxOccurs="1"name"first-name"
type="xsd:string"/>
        <elememt minOccurs="0"maxOccurs="1"name"middle-name"
type="xsd:string"/>
        <elememt minOccurs="1"maxOccurs="1"name"last-name"
type="xsd:string"/>
          </sequence>
        </complexType>
     </elememt>
        <elememt name="age"minOccurs="1"maxOccurs="1"type=xsd:int"/>

</sequence>
        </complexType>
     </elememt>
     </sequence>
   </complexType>
</elememt>
</schema>
```

FIG. 12
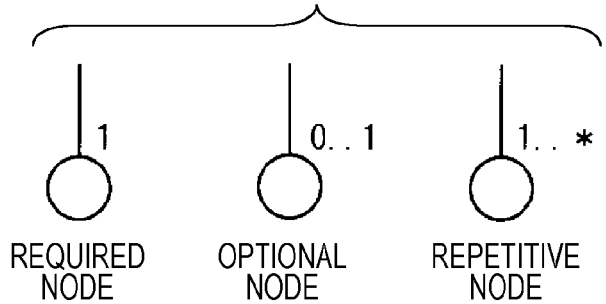
FIG. 13
```
<Employee>
  <person>
    <name>
      <first-name>Michiaki</first-name>
      <last-name>Tatsubori</last-name>
    </name>
    <age>33</age>
  </person>
</Employee>
```
FIG. 14
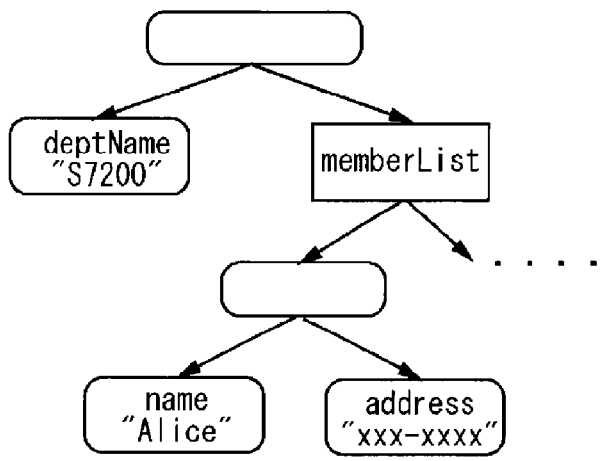
FIG. 15
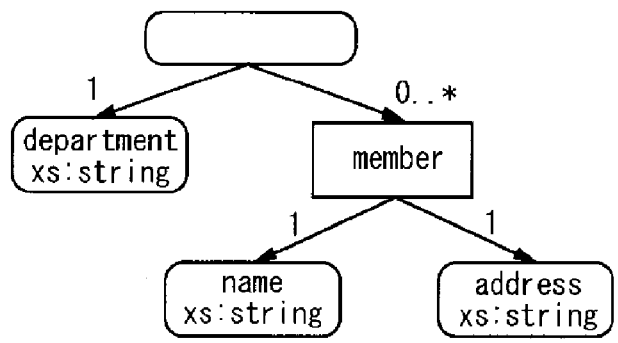

SELECTING A MAPPING THAT MINIMIZES CONVERSION COSTS

CROSS REFERENCE TO RELATED APPLICATION

This application claims priority under 35 U.S.C. 119 from Japanese Patent Application 2008-245866, filed Sep. 25, 2008, the entire contents of which are incorporated herein by reference.

BACKGROUND OF THE INVENTION

Field of the Invention

The present invention relates to an apparatus, a program, and a method for generating a mapping between individual properties included in an object in a program and the individual elements of a structured document.

Description of Related Art

Methods for converting Extensible Markup Language (XML) documents to objects handled by programs are known. "Document Object Model (DOM) Level 3 Core Specification," Apr. 7, 2004, W3C discloses the specifications of the Document Object Model (DOM) that is an application program interface for programs to access XML documents. "JSR 222: Java Architecture for XML Binding (JAXB) 2.0," Java Community Process discloses the specifications of the Java Architecture for XML Binding (JAXB) that provides the facility of a schema compiler and a schema generator for converting XML documents to Java (registered trademark) objects and converting Java objects to XML documents.

Also, methods for converting an object in a program to an XML document have been known. For example, in the DOM reference described above, an XML document can be generated from an object in which the individual elements of a converted XML document are reflected in advance. In the JAXB reference described above, an XML schema can be automatically generated from the class of a Java object, and an XML document can generated from the Java object on the basis of the automatically generated XML schema.

"Castor XML Mapping," ExoLab Group, Intalio Inc., and "JiBX: Binding XML to Java Code," Sosnoski Software Solutions Inc., disclose data binding tools for performing mapping between XML documents and objects. Any object can be converted to an XML document using such tools or libraries or PHP (a programming language for hypertext processing) SOAP functions.

Japanese Unexamined Patent Application Publication No. 2003-256455 discloses a method for converting XML documents to data models other than objects. Philip Bille, "A survey on tree edit distance and related problems," June 2005 discloses solutions to the tree editing problem, i.e., a problem of calculating the edit cost and procedure for obtaining the same tree structure as a second tree structure by editing a first tree structure.

The aforementioned processes for converting an object in a program to an XML document are complicated and often inconvenient for programmers. For example, in the DOM reference, unless an object in which the elements of an XML document are accurately reflected is generated in advance using a program, conversion cannot be performed appropriately. In the JAXB reference, an object not being a class that was used to generate an XML schema cannot be converted to an XML document. Even with the tools or libraries described in the ExoLab Group and Sosnoski Software references or PHP SOAP functions, programmers need to describe correspondences between the individual properties of an object of a program and the individual elements of a structured document in advance. Moreover, such description needs to be provided for the classes of all objects and the elements of all XML documents.

SUMMARY OF THE INVENTION

A first aspect of the present invention provides a generation apparatus that generates a mapping between individual properties included in an object in a program and individual elements of a structured document. The generation apparatus includes an object tree generation unit configured to generate a tree structure representing hierarchical structure of the object by assigning the individual properties included in the object to nodes of the tree structure; and a selection unit configured to select, from mappings that associate the individual properties included in the object with the individual elements of the structured document, a mapping minimizing conversion cost of converting the tree structure of the object to a tree structure that includes the individual elements of the structured document as its nodes.

According to another aspect of the invention, a method for generating a mapping between individual properties included in an object in a program and individual elements of a structured document includes the steps of: generating a tree structure representing hierarchical structure of the object by assigning the individual properties included in the object to nodes of the tree structure; and selecting, a mapping minimizing conversion cost of converting the tree structure of the object to a tree structure that includes the individual elements of the structured document as its nodes, said selecting being from mappings that associate the individual properties included in the object with the individual elements of the structured document.

A still further aspect of the invention provides computer programs which, when executed, cause a computer to act as the generation apparatus or to perform the steps of the above method.

BRIEF DESCRIPTION OF THE DRAWINGS

FIG. 4 shows an exemplary process performed in step S104 in FIG. 3.

FIG. 5 shows an exemplary program written in PHP.

FIG. 6 exemplifies the properties of the object, which has been converted to a tree structure, in the program shown in FIG. 5 and the respective values of the properties, described in XML.

FIG. 8 shows exemplary WSDL that defines a Web service.

FIG. 9 shows an exemplary schema described in XML (an XML schema).

FIG. 12 shows exemplary description of a mandatory node, an optional node, and a repetitive node.

FIG. 13 shows an exemplary XML document that is converted from the object shown in FIG. 5 on the basis of a mapping selected by the selection unit 42.

FIG. 14 shows an exemplary tree structure of an object that includes an array.

FIG. 15 shows an exemplary tree structure of an XML document that includes repetitive elements.

DETAILED DESCRIPTION OF PREFERRED EMBODIMENTS

Figure 1:
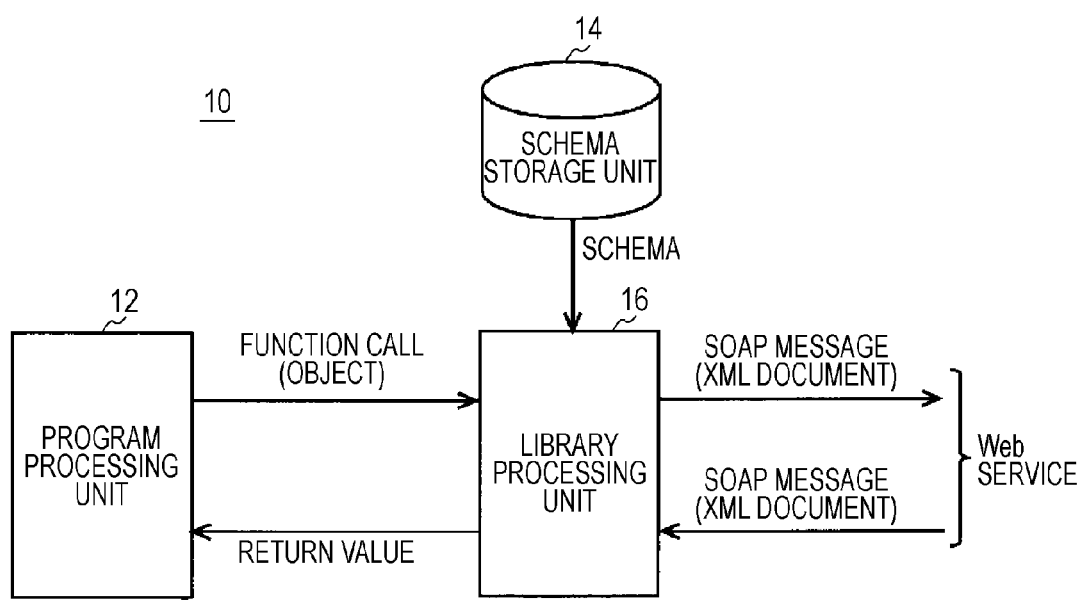
FIG. 1 shows the functional configuration of an information processing apparatus 10 according to an embodiment of the present invention.

FIG. 1 shows the functional configuration of an information processing apparatus 10 according to a preferred embodiment of the present invention. The information processing apparatus 10 is implemented via a computer that executes a program. The information processing apparatus 10 performs information processing provided by the program.

The information processing apparatus 10 can use a Web service provided by, for example, another computer in a network. In particular, the information processing apparatus 10 sends a SOAP message that includes an XML document to a Web service. The information processing apparatus 10 receives a SOAP message that includes an XML document representing the result of processing from the Web service to perform information processing using the result of processing.

The information processing apparatus 10 includes a program processing unit 12, a schema storage unit 14, and a library processing unit 16. The program processing unit 12 is implemented by execution of a program by a computer. The schema storage unit 14 stores schemata that define respective XML documents included in SOAP messages exchanged between the information processing apparatus 10 and Web services used by the information processing apparatus 10. The schema storage unit 14 is implemented via a storage unit in a computer or a storage unit connected to the computer through a network.

The library processing unit 16 exchanges SOAP messages that include XML documents with predetermined Web services. The library processing unit 16 is implemented by execution, by a computer, of programs in a library called in response to function calls by the program processing unit 12.

In particular, the library processing unit 16 receives, from the program processing unit 12, a function call that includes an object as an argument. The library processing unit 16 converts the object to an XML document based on an XML schema stored in the schema storage unit 14. The library processing unit 16 sends a SOAP message that includes the generated XML document to a Web service. The library processing unit 16 receives, from the Web service, a SOAP message that includes the result of processing expressed as an XML document. The library processing unit 16 converts the result of processing expressed as an XML document to an object in the data format handled by the program processing unit 12 and sends the object as a return value to the program processing unit 12.

Figure 2:
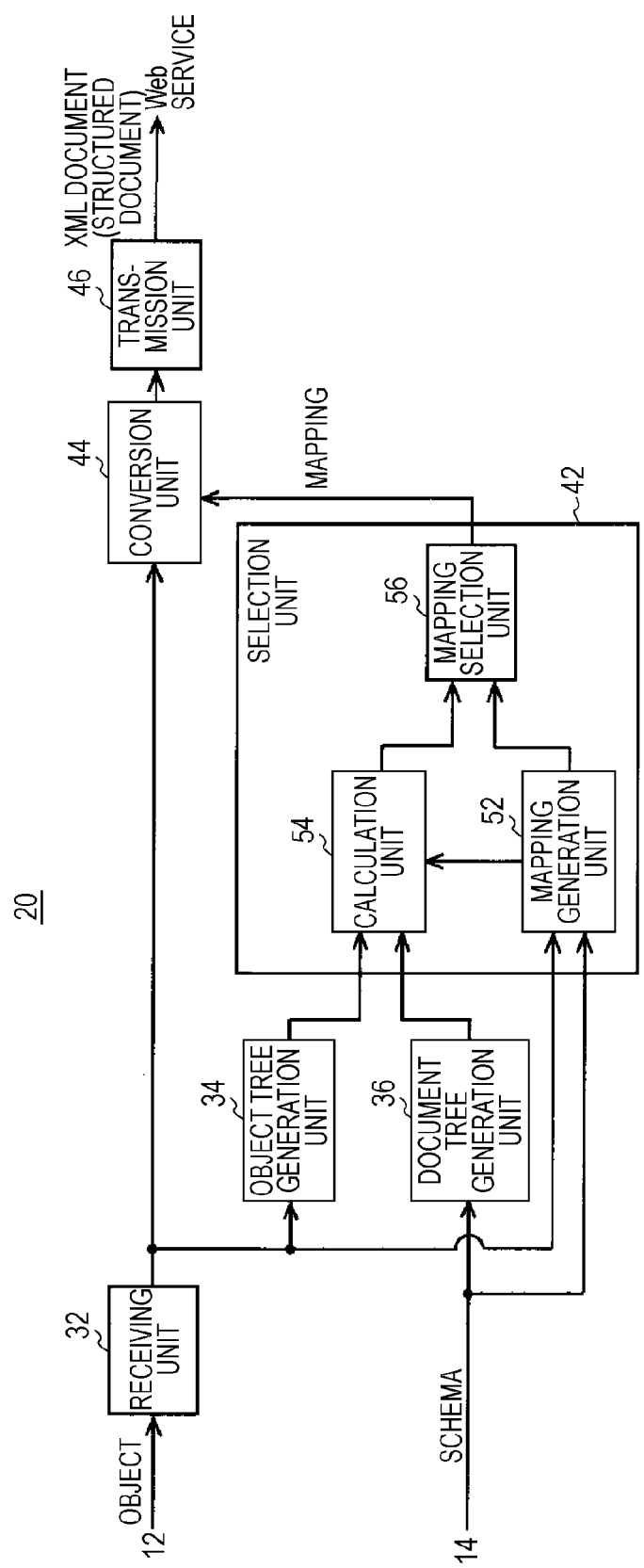
FIG. 2 shows the functional configuration of a generation apparatus 20 according to the embodiment of the present invention.

FIG. 2 shows the functional configuration of a generation apparatus 20 according to the embodiment. The generation apparatus 20 is implemented as one of the functions of the library processing unit 16 and converts an object in a program to a structured document based on a schema. In detail, the generation apparatus 20 generates mappings that represent correspondences between individual properties included in an object in a program and the individual elements of a structured document generated according to a schema. The generation apparatus 20 generates and outputs, on the basis of the generated mappings, the structured document based on the schema, the structured document including the values of the individual properties included in the object as the values of the elements corresponding to the properties.

An object represents, for example, an object and array data handled in an object-oriented program and serial array data used in, for example, a program written in PHP. A schema represents information that defines the hierarchical structure of a structured document. In the embodiment, a schema defines the hierarchical structure of an XML document that is an exemplary structured document. The generation apparatus 20 may convert a single object to a single structured document or a plurality of objects to a single structured document. The generation apparatus 20 may convert an object to a structured document other than an XML document (for example, a Hypertext Markup Language (HTML) document).

The generation apparatus 20 includes a receiving unit 32, an object tree generation unit 34, a document tree generation unit 36, a selection unit 42, a conversion unit 44, and a transmission unit 46. In execution of a program, the receiving unit 32 receives, from the program processing unit 12, a function call, with an object as an argument, indicating to convert the object to an XML document and transmit the XML document.

The object tree generation unit 34 generates a tree structure that represents the hierarchical structure of the object in the function call received by the receiving unit 32 by assigning individual properties included in the object to the nodes of the tree structure. The document tree generation unit 36 generates, from a schema that describes the hierarchical structure of an XML document stored in the schema storage unit 14, a tree structure that includes the individual elements of the XML document as the nodes of the tree structure. For example, the document tree generation unit 36 generates a tree structure in which the definitions of the individual elements of an XML document described in a schema are set as nodes, and the definitions of the number of child elements of the XML document described in the schema are set as edges.

The selection unit 42 selects, from mappings that associate the individual properties included in the object with the individual elements of the XML document, a mapping that minimizes the conversion cost of converting the tree structure of the object to the tree structure of the XML document generated by the document tree generation unit 36. For example, the selection unit 42 includes a mapping generation unit 52, a calculation unit 54, and a mapping selection unit 56.

The mapping generation unit 52 generates a plurality of mappings that associate the individual properties included in the object received by the receiving unit 32 with the individual elements of the XML document. For each of the plurality of mappings generated by the mapping generation unit 52, the calculation unit 54 calculates, according to the mapping, the conversion cost of converting the tree structure of the object received by the receiving unit 32 to the tree structure of the XML document generated by the document tree generation unit 36. The mapping selection unit 56 selects, from the plurality of mappings generated by the mapping generation unit 52, a mapping that minimizes the conversion cost calculated by the calculation unit 54.

The conversion unit 44 converts, on the basis of the mapping selected by the selection unit 42, the object to the XML document, which includes the values of the individual properties of the object as the values of the corresponding elements. The transmission unit 46 transmits the XML document output from the conversion unit 44.

Figure 3:
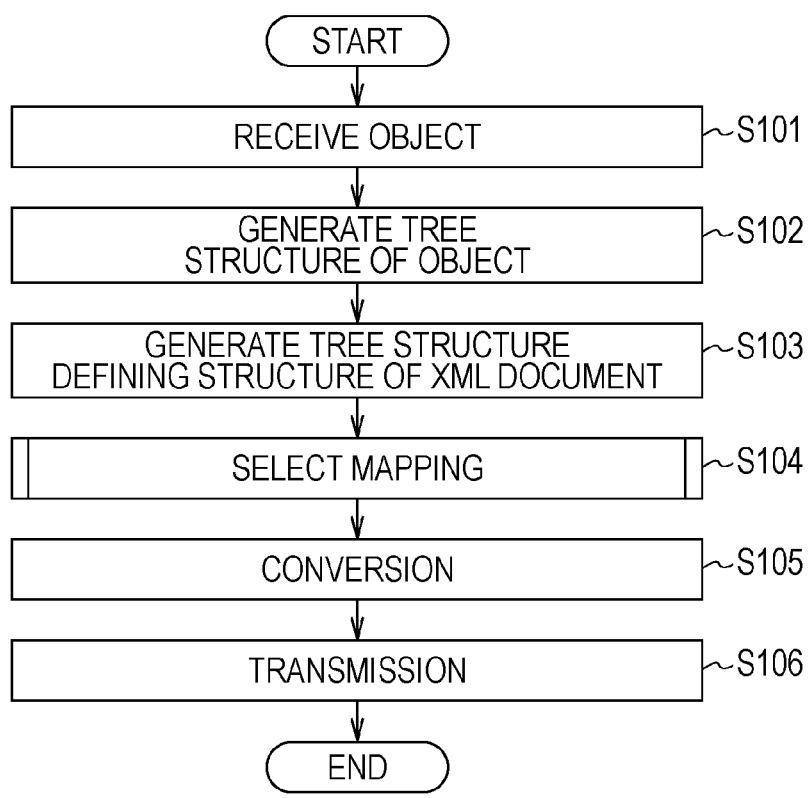
FIG. 3 shows the process flow of the generation apparatus 20.

FIG. 3 shows the process flow of the generation apparatus 20. The receiving unit 32 first receives, from the program processing unit 12, a function call that indicates to convert an object in a program of interest to an XML document and transmit the XML document (step S101).

The object tree generation unit 34 retrieves an object included in the received function call as an argument. The object tree generation unit 34 generates a tree structure that represents the hierarchical structure of the object by assigning individual properties included in the retrieved object to the nodes of the tree structure (step S102).

The document tree generation unit 36 retrieves a schema from the schema storage unit 14 that describes the hierarchical structure of an XML document to be output in response to the received function call. According to the retrieved schema, the document tree generation unit 36 generates, from the schema, a tree structure that defines the structure of the XML document to be transmitted (step S103).

The selection unit 42 selects, from mappings that associate the individual properties included in the object with the individual elements of the XML document, a mapping that minimizes the conversion cost of converting, according to the mapping, the tree structure of the object to the tree structure of the XML document defined by the schema (step S104). In this case, the conversion cost of converting, according to a mapping, the tree structure of an object to the tree structure of an XML document represents the cost of converting, according to the mapping, the tree structure of the object to the tree structure of the XML document so that nodes corresponding to the individual properties of the object correspond to respective elements associated with the properties.

The selection unit 42 finds a mapping that minimizes the conversion cost among a plurality of mappings. For example, the selection unit 42 finds a mapping that minimizes the conversion cost of converting the tree structure of the object to the tree structure of the XML document by solving the tree editing problem shown in, for example, the Bille article referred to above.

The conversion unit 44 converts, according to the mapping selected by the selection unit 42, the object included in the received function call as an argument to the XML document defined by the schema, the XML document including the values of the individual properties of the object as the values of the corresponding elements (step S105). The transmission unit 46 transmits, to a Web service, a SOAP message that includes the XML document output from the conversion unit 44 (step S106).

In the aforementioned manner, the generation apparatus 20 can automatically generate a mapping between individual properties included in an object in a program and a structured document defined by a schema (for example, an XML document). In this case, the generation apparatus 20 may output a mapping selected by the selection unit 42 to the outside. Such a generation apparatus 20 can provide a generated mapping so that the mapping is used by a known tool that converts an object to an XML document or the mapping is referred to in analysis of correspondences between the properties of an object and the elements of an XML document.

FIG. 4 shows an exemplary process performed in step S104 in FIG. 3. For example, in step S104 in FIG. 3, the selection unit 42 may perform steps S111 to S113.

The mapping generation unit 52 first generates a plurality of mappings that associates individual properties included in an object with the individual elements of an XML document (step S111). For each of the plurality of generated mappings, the calculation unit 54 calculates the minimum edit cost of converting, according to the mapping, the tree structure of the object to the tree structure of the XML document (step S112). Then, the calculation unit 54 determines the calculated minimum edit cost as being the conversion cost of the mapping.

Edit operations for changing one tree structure (a first tree structure) so that the one tree structure has the same hierarchical structure as another tree structure (a second tree structure) include, for example, renaming nodes, changing the sequence of nodes, and adding nodes. The first tree structure can be converted to the same structure as the second tree structure by combining such edit operations. Edit operation cost is allocated to each of the edit operations. Many procedures for the edit operations of converting the first tree structure to the same structure as the second tree structure exist, and the total edit operation cost of the edit operations used in each of the procedures varies with the procedure.

Thus, for example, when the tree structure of an object is converted to the tree structure of an XML document by performing, on the tree structure of the object, an edit process in which edit operations are performed at least once, the edit operations including renaming nodes (properties), changing the sequence of a plurality of child nodes that belong to a common parent node, and adding a parent node for at least one node, the calculation unit 54 may calculate the total of edit operation costs associated with the respective edit operations as the edit cost of the edit process. The calculation unit 54 may determine, as being the minimum edit cost, the edit cost of an edit process that is determined as minimizing edit cost among at least one edit process for converting the tree structure of the object to the tree structure of the XML document.

In this case, since an XML document that includes all the properties in an object needs to be generated, the calculation unit 54 need not calculate edit cost regarding an edit process that includes deletion of nodes. The calculation unit 54 need not calculate edit cost regarding an edit process that is expected not to minimize edit cost, i.e., an edit process the edit cost of which is expected in advance to be more than a predetermined value. This can reduce the amount of calculation in the calculation unit 54.

The mapping selection unit 56 selects, from the plurality of mappings generated by the mapping generation unit 52, a mapping that minimizes the conversion cost calculated by the calculation unit 54 (step S113). In this manner, the selection unit 42 can find a mapping that minimizes the conversion cost of converting the tree structure of an object to the tree structure of an XML document. In this case, the mapping generation unit 52 may omit processing for some mappings to rapidly complete selection of a mapping.

FIG. 5 shows an exemplary program written in PHP. In the program shown in FIG. 5, "new AgileSoapClient("employee.wsdl")" is a function call that calls a program in a library, the program preparing for transmission of a SOAP message In the program shown in FIG. 5, "publishEmployee ($person)" is an exemplary function call and an exemplary object included as an argument prepared by the aforementioned program. The object is referred to by a variable $person and includes 'name', 'firstname', and 'age' as its properties. Moreover, 'name'='Tatsubori', 'firstname'='Michiaki', and 'age'='33' are stored as the respective values of the properties.

The program processing unit 12 can transfer the function call ("new AgileSoapClient("employee.wsdl")"), which calls the program preparing for transmission of the SOAP message, to the library processing unit 16 by execution of the PHP program shown in FIG. 5 by a computer. Then, the library processing unit 16, to which such function call has been transferred, can convert, to an XML document, a function call that is separately called and an object included in the function call as an argument ("publishEmployee ($person)") to add the XML document to the SOAP message.

Figure 7:
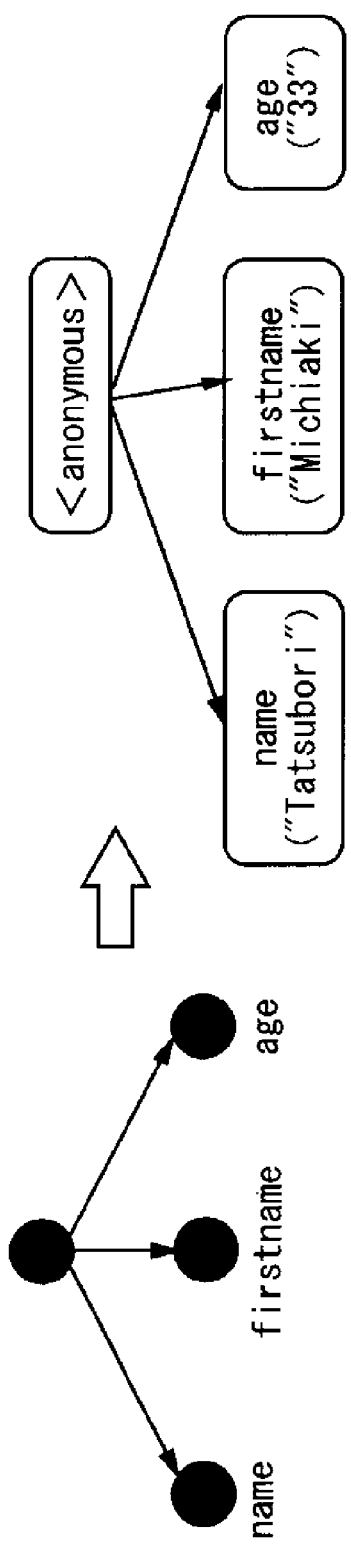
FIG. 7 exemplifies the properties of the object, which has been converted to a tree structure, in the program shown in FIG. 5 and the respective values of the properties, described schematically.

FIGS. 6 and 7 exemplify the properties of the object, which has been converted to a tree structure, in the program shown in FIG. 5 and the respective values of the properties. FIG. 6 shows an example that is described in XML. FIG. 7 shows an example that is described schematically. When the object in the program shown in FIG. 5 is given to the object tree generation unit 34, the object tree generation unit 34 generates a tree structure that includes three child nodes ('name'='Tatsubori', 'firstname'='Michiaki', and 'age'='33') directly below a parent node (anonymous), as shown in FIGS. 6 and 7.

FIG. 8 shows exemplary WSDL that defines a Web service. The WSDL shown in FIG. 8 defines a Web service called "PublishEmployeeServiceRequest". When the library processing unit 16 has been called by the function call in the program shown in FIG. 5, the library processing unit 16 sends a SOAP message based on the definition by the WSDL shown in FIG. 8.

Figure 10:
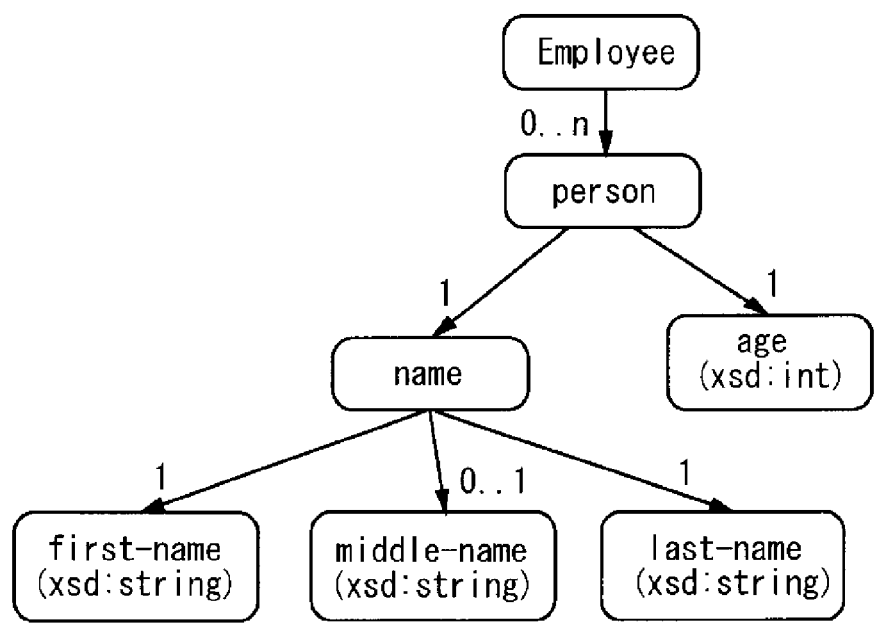
FIG. 10 shows the tree structure of an XML document defined by the schema shown in FIG. 9.

FIG. 9 shows an exemplary schema described in XML (an XML schema). FIG. 10 shows the tree structure of an XML document defined by the schema shown in FIG. 9.

The schema shown in FIG. 9 defines the hierarchical structure of the XML document to be added to the SOAP message to be sent to the Web service defined by the WSDL shown in FIG. 8. The XML document based on the schema shown in FIG. 9 includes elements the respective names of which are defined as "Employee", "person", "name", "age", "first-name", "middle-name", and "last-name". When the schema shown in FIG. 9 is given to the document tree generation unit 36, the document tree generation unit 36 generates the tree structure shown in FIG. 10.

The element "Employee" in the XML document defined by the schema shown in FIG. 9 is located at the root node of the tree structure, as shown in FIG. 10. The elements "person" are located as the child nodes of the element "Employee". In this case, the elements "person" are repetitive nodes. In an XML document, 0 to n (n is any integer equal to or more than one) repetitive nodes may be provided.

The "name" element and the "age" element in the XML document defined by the schema shown in FIG. 9 are located as the child nodes of each of the "person" elements, as shown in FIG. 10. In this case, each of the "name" element and the "age" element is a mandatory node that needs to occur once in an XML document. An integer value is stored as the value of the "age" element.

The "first-name" element, the "middle-name" element, and the "last-name" element in the XML document defined by the schema shown in FIG. 9 are located as the child nodes of the "name" element, and a character string is stored as the value of each of the "first-name" element, the "middle-name" element, and the "last-name" element, as shown in FIG. 10. In this case, each of the "first-name" element and the "last-name" is a mandatory node that needs to occur once in an XML document. The "middle-name" element is an optional node that may be optionally provided in an XML document.

Figure 11:
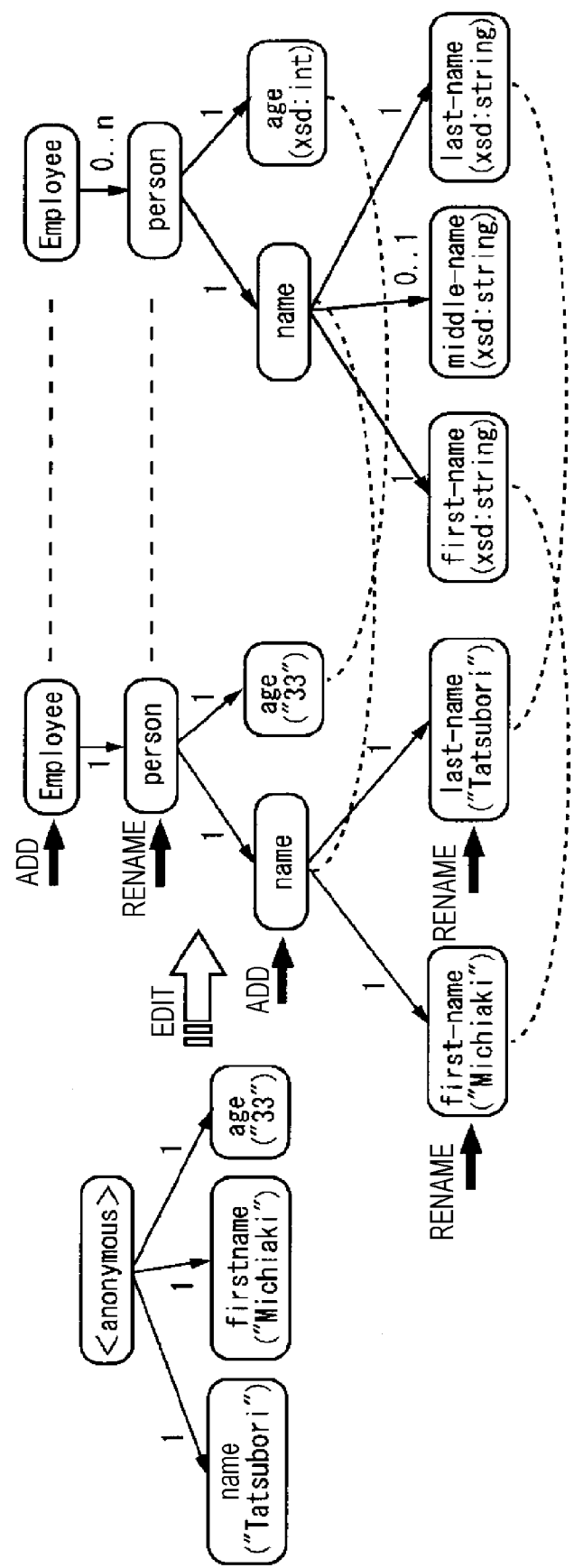
FIG. 11 shows an exemplary edit to convert the tree structure of the object shown in FIG. 7 to the tree structure of the XML document shown in FIG. 10.

FIG. 11 shows an exemplary edit to convert the tree structure of the object shown in FIG. 7 to the tree structure of the XML document shown in FIG. 10. FIG. 11 shows an example in which the 'name' property, 'firstname' property, and 'age' property of the object are associated respectively with the "last-name" element, "first-name" element, and "age" element of the XML document by a mapping.

In this example, the calculation unit 54 may perform an edit operation of adding the "Employee" node as the parent node of the "anonymous" node in the tree structure of the object. The calculation unit 54 may also perform an edit operation of renaming the "anonymous" node in the tree structure of the object the "person" node.

The calculation unit 54 may perform an edit operation of adding the "name" node as the parent node of each of the "name" node and the "firstname" node in the tree structure of the object. The calculation unit 54 may perform an edit operation of renaming the "name" node in the tree structure of the object the "last-name" node. The calculation unit 54 may perform an edit operation of renaming the "firstname" node in the tree structure of the object the "first-name" node.

When the calculation unit 54 converts the tree structure of the object to the tree structure of the XML document by performing, on the tree structure of the object, an edit process that includes such edit operations, for example, renaming nodes and adding parent nodes, the calculation unit 54 calculates the total of edit operation costs associated with the respective edit operations as the edit cost of the edit process. Then the calculation unit 54 calculates, as the minimum edit cost, the edit cost of an edit process that is determined as minimizing edit cost among at least one edit process for converting the tree structure of the object to the tree structure of the XML document.

FIG. 12 shows exemplary description of a mandatory node, an optional node, and a repetitive node. The calculation unit 54 may perform an edit operation of adding, to each of the nodes of the tree structure of the object, type information (for example, "1", "0 . . . 1", and "0 . . . *" in FIG. 12) specifying a node type, for example, a mandatory node, an optional node, or a repetitive node. For example, the calculation unit 54 may determine the edit operation cost of such an edit operation as being lower than the edit operation cost of an edit operation of adding a node. For example, assuming that the edit operation cost of an edit operation of adding a node is one, the edit operation cost of an edit operation of adding type information may be set to zero.

When the calculation unit 54 renames a node, the calculation unit 54 may determine the distance (for example, the Levenshtein distance) between the character string of a node name that has not been changed (i.e., the name of a property of an object) and the character string of the node name (i.e., an element defined by a schema), which has been changed, as being edit operation cost associated with this edit operation. In this case, regarding an edit operation of a predetermined part, for example, a prefix that is provided at the beginning of a name, the calculation unit 54 may set the edit operation cost lower than the edit operation cost of an edit operation of another part.

Regarding an edit operation of interchanging child nodes that have the same parent node, the calculation unit 54 may set the edit operation cost lower than the edit operation cost of an edit operation of interchanging nodes other than such child nodes. For example, regarding an edit operation of interchanging child nodes that have the same parent node, the calculation unit 54 may set the edit operation cost to zero. Regarding an edit operation of generating a new node by combining a plurality of nodes at the same level, the calculation unit 54 may set the edit cost lower than the edit cost of an edit operation of adding a new node.

When a mapping for each of the plurality of objects is generated, the mapping selection unit 56 may store the mapping selected for the object in a storage unit. Then, when a plurality of mappings with the same edit cost exist for a certain object, the mapping selection unit 56 may select, from the plurality of mappings with the same edit cost, a mapping that is the same as or similar to a corresponding mapping stored in the storage unit (i.e., a mapping selected in the past).

FIG. 13 shows an exemplary XML document that is converted from the object shown in FIG. 5 on the basis of a mapping selected by the selection unit 42. In the aforementioned manner, the selection unit 42 selects, from mappings that associate individual properties included in an object with the individual elements of an XML document, a mapping that minimizes the conversion cost of converting the tree structure of the object to the tree structure of an XML document generated by the document tree generation unit 36.

In this example, the selection unit 42 selects a mapping that associates the 'name' property, 'firstname' property, and 'age' property of the object respectively with the "lastname" element, "first-name" element, and "age" element of the XML document. As a result, when the object shown in FIG. 5 has been given to the conversion unit 44, the conversion unit 44 can output the XML document shown in FIG. 13. Accordingly, the conversion unit 44 can convert a given object to an XML document based on a schema.

FIG. 14 shows an exemplary tree structure of an object that includes an array. FIG. 15 shows an exemplary tree structure of an XML document that includes repetitive elements.

In FIG. 14, a "memberList" node is an array node that has the individual elements of an array as its child nodes. In FIG. 15, "member" nodes are repetitive nodes corresponding to repetitive elements repetition of which is specified.

When the object given from the program includes the array, the object tree generation unit 34 may generate the tree structure of the object that includes the array node having the individual elements of the array included in the object as its child nodes, as shown in FIG. 14. When the XML document defined by a schema includes the repetitive elements, the document tree generation unit 36 may generate the tree structure of the XML document that includes the repetitive elements, repetition of which is specified in the XML document, as the repetitive nodes, as shown in FIG. 15.

When the object given from the program includes the array and the XML document defined by the schema includes the repetitive elements, the mapping generation unit 52 may generate a mapping that associates the properties of the array included in the object with the repetitive elements, repetition of which is specified in the XML document. That is, the mapping generation unit 52 may generate a mapping that associates the array node in the tree structure of the object with the repetitive nodes in the tree structure of the XML document. This allows the mapping generation unit 52 to generate a mapping that associates the properties of the array included in the object with the repetitive elements, repetition of which is specified in the XML document.

Figure 16A:
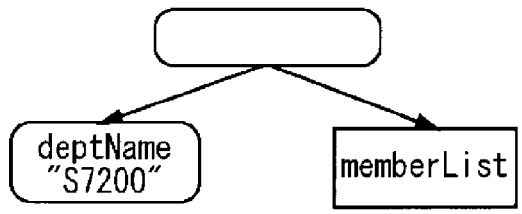
FIG. 16A shows an exemplary tree structure obtained by removing the child nodes of the array node from the tree structure of the object shown in FIG. 14.
Figure 16B:
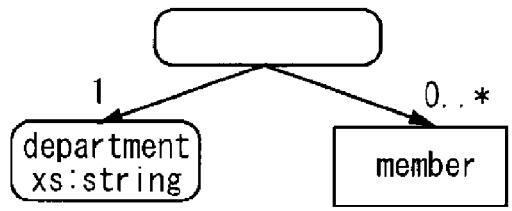
FIG. 16B shows an exemplary tree structure obtained by removing the child nodes of the repetitive nodes from the tree structure of the XML document shown in FIG. 15.
Figure 17A:
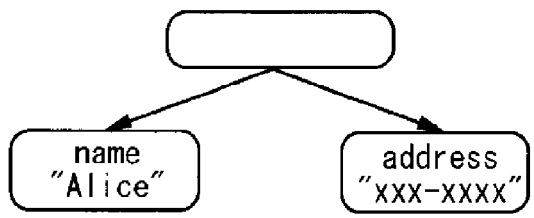
FIG. 17A shows an exemplary tree structure of a part on the low end side of the tree structure of the object shown in FIG. 14, the top of the part being one of the child nodes of the array node.
Figure 17B:
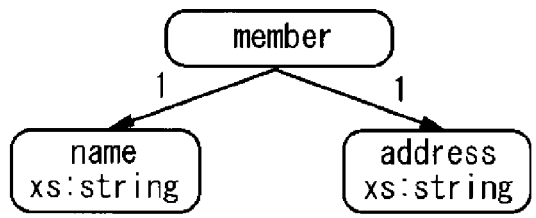
FIG. 17B shows an exemplary tree structure of a part on the low end side of the tree structure of the XML document shown in FIG. 15, the top of the part being one of the repetitive nodes.

FIG. 16A shows an exemplary tree structure obtained by removing the child nodes of the array node from the tree structure of the object shown in FIG. 14. FIG. 16B shows an exemplary tree structure obtained by removing the child nodes of the repetitive nodes from the tree structure of the XML document shown in FIG. 15. FIG. 17A shows an exemplary tree structure of a part on the low end side of the tree structure of the object shown in FIG. 14, the top of the part being one of the child nodes of the array node. FIG. 17B shows an exemplary tree structure of a part on the low end side of the tree structure of the XML document shown in FIG. 15, the top of the part being one of the repetitive nodes.

When the object given from the program includes the array and the XML document defined by the schema includes the repetitive elements, the mapping generation unit 52 may generate a mapping that associates the nodes of the tree structure, shown in FIG. 16A, obtained by removing the child nodes of the array node from the tree structure of the object with the nodes of the tree structure, shown in FIG. 16B, obtained by removing the child nodes of the repetitive nodes from the tree structure of the XML document.

In this case, when the array node in the tree structure of the object has been associated with the repetitive nodes in the tree structure of the XML document, the mapping generation unit 52 may generate correspondences between the child nodes of the array node and the child nodes of the repetitive nodes. That is, the mapping generation unit 52 may generate correspondences between the tree structure of the part on the low end side, shown in FIG. 17A, the top of the part being one of the child nodes of the array node, and the tree structure of the part on the low end side, shown in FIG. 17B, the top of the part being one of the repetitive nodes. This allows the mapping generation unit 52 to generate a mapping that associates the properties of each of the elements of the array included in the object with the individual elements on the low end side of each of the repetitive elements, repetition of which is specified in the XML document.

The document tree generation unit 36 may generate the tree structure of an XML document that includes an optional element designated optional as an optional node and a mandatory element designated required as a mandatory node. When a parent node, on the side of an object, that includes child nodes in the tree structure of the object is associated with a parent node, on the side of an XML document, that includes optional nodes and mandatory nodes in the tree structure of the XML document, the mapping generation unit 52 may preferentially associate the child nodes in the tree structure of the object with the mandatory nodes. Thus, the mapping generation unit 52 can prevent a situation in which an XML document based on a schema cannot be generated because no value is stored in a mandatory node in the XML document.

In a case where a mapping for each of the plurality of objects is generated, when the mapping generation unit 52 has generated, according to the description of one part of a program, a correspondence between one child node and a mandatory node, the mapping generation unit 52 may store the correspondence in a history storage unit. Then, when the correspondence between the one child node and the mandatory node is stored in the history storage unit, according to the description of another part of the program, the mapping generation unit 52 may associate the one child node with the mandatory node, and associate another child node with an optional node. Thus, the mapping generation unit 52 can perform consistent mapping for each of the plurality of objects in the program.

Figure 18:
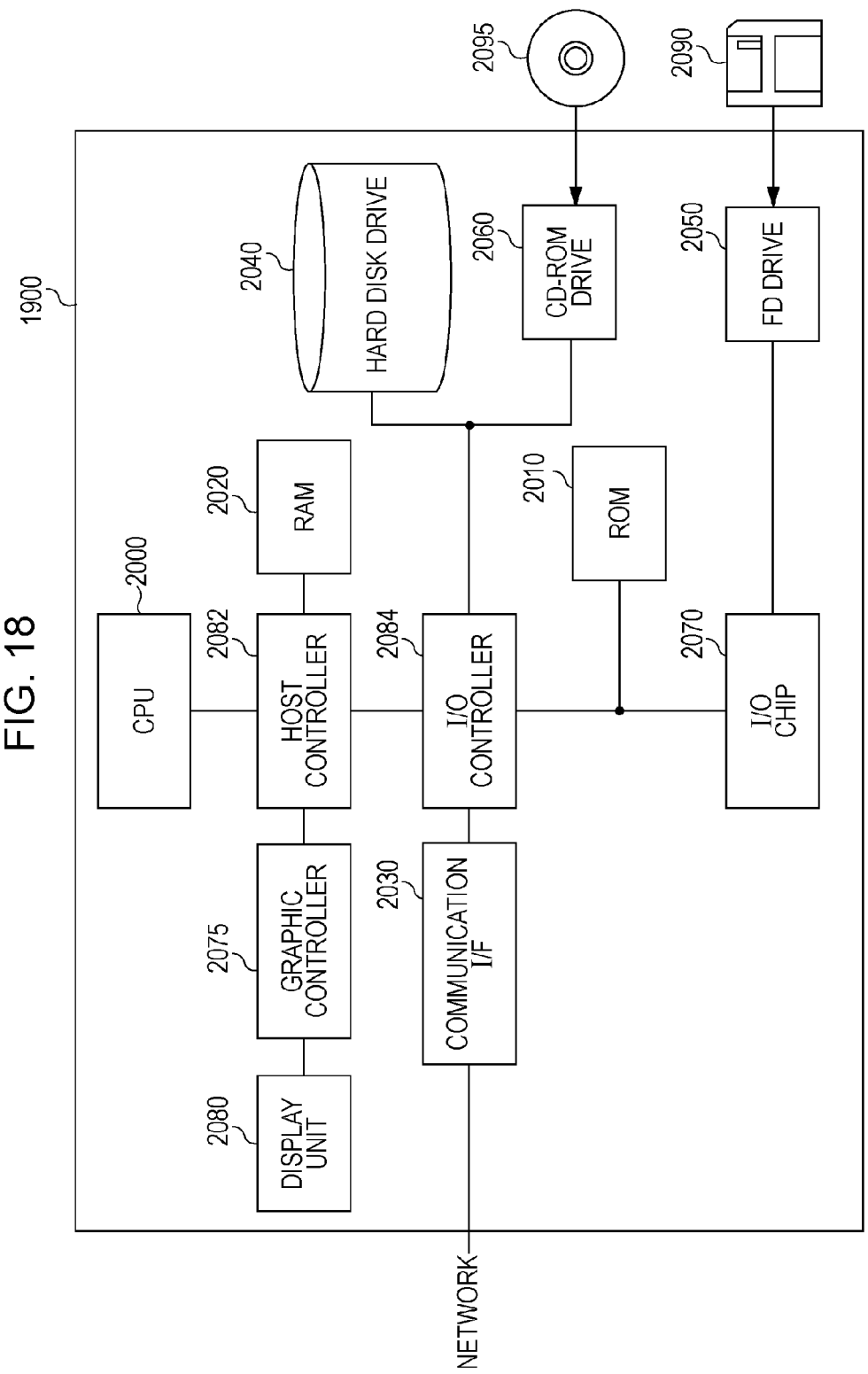
FIG. 18 shows an exemplary hardware configuration of a computer 1900 according to the embodiment of the present invention.

FIG. 18 shows an exemplary hardware configuration of a computer 1900 according to the embodiment. The computer 1900 according to the embodiment includes a CPU peripheral section that includes a CPU 2000, a RAM 2020, a graphic controller 2075, and a display unit 2080 that are connected to each other via a host controller 2082, an input-output section that includes a communication interface 2030, a hard disk drive 2040, and a CD-ROM drive 2060 that are connected to the host controller 2082 via an input-output controller 2084, and a legacy input-output section that includes a ROM 2010, a flexible disk drive 2050, and an input-output chip 2070 that are connected to the I/O controller 2084.

The host controller 2082 connects the RAM 2020 to the CPU 2000 and the graphic controller 2075, which access the RAM 2020 at a high transfer rate. The CPU 2000 operates on the basis of programs stored in the ROM 2010 and the RAM 2020 and controls individual components. The graphic controller 2075 obtains image data generated in a frame buffer provided in the RAM 2020 by, for example, the CPU 2000 and displays the image data on the display unit 2080. Alternatively, the graphic controller 2075 may include a frame buffer for storing image data generated by, for example, the CPU 2000.

The input-output controller 2084 connects the host controller 2082 to the communication interface 2030, the hard disk drive 2040, and the CD-ROM drive 2060, which are relatively high-speed input-output units. The communication interface 2030 communicates with another apparatus via a network. The hard disk drive 2040 stores programs and data used by the CPU 2000 in the computer 1900. The CD-ROM drive 2060 reads programs or data from a CD-ROM 2095 and supplies the programs or data to the hard disk drive 2040 via the RAM 2020.

The ROM 2010, the flexible disk drive 2050, and the input-output chip 2070, which are relatively low-speed input-output units, are connected to the input-output controller 2084. The ROM 2010 stores a boot program that is executed when the computer 1900 is activated and/or, for example, programs that depend on the hardware of the computer 1900. The flexible disk drive 2050 reads programs or data from a flexible disk 2090 and supplies the programs or data to the hard disk drive 2040 via the RAM 2020. The input-output chip 2070 connects the flexible disk drive 2050 to the input-output controller 2084 and connects various types of input-output units to the input-output controller 2084 via, for example, a parallel port, a serial port, a keyboard port, and a mouse port.

Programs to be supplied to the hard disk drive 2040 via the RAM 2020 are stored in a recording medium, for example, the flexible disk 2090, the CD-ROM 2095, or an IC card, and supplied to users. The programs are read from the recording medium, installed in the hard disk drive 2040 in the computer 1900 via the RAM 2020, and executed in the CPU 2000.

Programs installed in the computer 1900 to cause the computer 1900 to function as the generation apparatus 20 include a receiving module, an object tree generation module, a document tree generation module, a selection module, a conversion module, and a transmission module. The programs or modules work, for example, the CPU 2000 so as to cause the computer 1900 to function as the receiving unit 32, the object tree generation unit 34, the document tree generation unit 36, the selection unit 42, the conversion unit 44, and the transmission unit 46.

The information processing described in the programs is read by the computer 1900 to function as the receiving unit 32, the object tree generation unit 34, the document tree generation unit 36, the selection unit 42, the conversion unit 44, and the transmission unit 46, which are concrete means in which software and the aforementioned various types of hardware resources cooperate with each other. Then, calculation or processing of information specific to an intended use by the computer 1900 according to the embodiment is implemented by the concrete means to construct the generation apparatus 20 specific to the intended use.

For example, when the computer 1900 communicates with, for example, an external apparatus, the CPU 2000 executes a communication program loaded into the RAM 2020 to indicate to the communication interface 2030 to perform communication processing according to the content of processing described in the communication program. The communication interface 2030 reads, under the control of the CPU 2000, transmit data stored in, for example, a transmit buffer area provided in a storage unit, such as the RAM 2020, the hard disk drive 2040, the flexible disk 2090, or the CD-ROM 2095, and transmits the transmit data to the network.

The communication interface 2030 further writes receive data received from the network to, for example, a receive buffer area provided in the storage unit. The communication interface 2030 may perform transfer of transmit and receive data from and to the storage unit by the direct memory access (DMA) method in this manner. Alternatively, the CPU 2000 may read data from the storage unit or the communication interface 2030, which is a source, and then write the data to the communication interface 2030 or the storage unit, which is a destination, so as to perform transfer of transmit and receive data.

The CPU 2000 causes all or a necessary part of, for example, a file or a database stored in an external storage unit, such as the hard disk drive 2040, the CD-ROM drive 2060 (the CD-ROM 2095), or the flexible disk drive 2050 (the flexible disk 2090), to be read into the RAM 2020 by, for example, DMA transfer. The CPU 2000 performs various types of processing on the data in the RAM 2020.

The CPU 2000 writes the data having been processed back to the external storage unit by, for example, DMA transfer. In such processing, since the RAM 2020 can be considered to temporarily store the content in the external storage unit, in the embodiment, the RAM 2020, the external storage unit, and the like are collectively called, for example, a memory, a storage, or a storage unit.

Various types of programs and various types of information such as data, tables, and a database in the embodiment are stored in such a storage unit and subjected to information processing. In this case, the CPU 2000 may store a part of data in the RAM 2020 in a cache memory and perform read and write operations on the cache memory. Even in such a case, since the cache memory undertakes some of the functions of the RAM 2020, in the embodiment, it is assumed that the cache memory is included in the RAM 2020, a memory, and/or a storage unit, except where distinguished.

The CPU 2000 performs various types of processing on data read from the RAM 2020. The particular processing is specified by a string of instructions in a program, the various types of processing including, for example, various types of calculation, processing of information, condition determination, and retrieval and replacement of information described in the embodiment. Then, the CPU 2000 writes the processed data back to the RAM 2020.

For example, when the CPU 2000 performs condition determination, the CPU 2000 compares each of the various types of variables shown in the embodiment with another variable or a constant and determines whether a condition is satisfied. The condition includes, for example, the variable is more than the other variable or the constant, the variable is less than the other variable or the constant, the variable is equal to or more than the other variable or the constant, the variable is equal to or less than the other variable or the constant, and the variable is equal to the other variable or the constant. The process branches to a different string of instructions, or a subroutine is called, after the condition is satisfied (or is not satisfied).

The CPU 2000 can search for information stored in, for example, a file or a database in a storage unit. For example, when a plurality of entries in each of which the attribute value of a first attribute is associated with the attribute value of a second attribute are stored in a storage unit, the CPU 2000 can obtain the attribute value of the second attribute associated with the attribute value of the first attribute that satisfies a predetermined condition by searching for an entry in which the attribute value of the first attribute satisfies the predetermined condition in the plurality of entries stored in the storage unit and reading the attribute value of the second attribute stored in the entry.

The programs or modules, which have been described, may be stored in an external recording medium. Other than the flexible disk 2090 and the CD-ROM 2095, for example, an optical recording medium such as a DVD or a CD, a magneto-optical recording medium such as an MO, a tape medium, or a semiconductor memory such as an IC card may be used as a recording medium. A storage unit, such as a hard disk or a RAM, provided in a server system connected to a private communication network or the Internet may be used as a recording medium, and the programs may be supplied to the computer 1900 via the network.

It should be noted that, regarding the execution sequence of process steps in the apparatuses, the systems, the programs, and the methods described in the claims, the specification, and the drawings, the programs, and the methods can typically be implemented with any sequence of processes unless the output of a preceding process is used by a following process.

While the present invention has been described with reference to the preferred embodiment, the technical scope of the present invention is not limited to the description of the aforementioned embodiment. It is obvious to persons skilled in the art that various changes or improvements can be made in the aforementioned embodiment. It is obvious from the description of the claims that the embodiment, in which such changes or improvements are made, is also covered by the scope of the present invention.

What is claimed is:

1. A generation apparatus that generates a mapping between individual properties included in an object in a program and individual elements of a structured document, the generation apparatus comprising:
   an object tree generation unit configured to generate a tree structure representing hierarchical structure of the object by assigning the individual properties included in the object to nodes of the tree structure;
   a selection unit configured to select a mapping minimizing conversion cost of converting the tree structure of the object to a tree structure that includes the individual elements of the structured document as its nodes;
   a document tree generation unit configured to generate a tree structure of the structured document from a schema describing hierarchical structure of the structured document; and
   a mapping generation unit that is configured to preferentially associate the child nodes in the tree structure of the object with the mandatory node (i) when a parent node on a side of the object, that includes child nodes in the tree structure of the object is associated with a parent node and (ii) on a side of the structured document that includes the optional nodes and the mandatory nodes in the tree structure of the structured document;
   wherein the selection unit selects a mapping minimizing conversion cost of converting the tree structure of the object to the tree structure of the structured document generated by the document tree generation unit;
   wherein the document tree generation unit is configured to generate a tree structure of the structured document that includes an optional element designated optional as an optional node and a mandatory element designated required as a mandatory node; and
   wherein the mapping is selected from mappings that associate the individual properties included in the object with the individual elements of the structured document.

2. The generation apparatus according to claim 1, wherein the selection unit includes:
   a calculation unit that, for each of the mappings, is configured to calculate minimum edit cost of converting the tree structure of the object to the tree structure of the structured document, and sets the minimum edit cost as conversion cost of the mapping, and
   a mapping selection unit that is configured to select a mapping with minimum conversion cost calculated by the calculation unit.

3. The generation apparatus according to claim 1, further comprising:
   a conversion unit configured to convert the object to the structured document, which includes values of the individual properties of the object as values of the corresponding elements, such conversion being on the basis of the mapping selected by the selection unit.

4. The generation apparatus according to claim 3, further comprising:
   a receiving unit configured to receive a function call with the object as an argument, indicating to convert the object to the structured document and transmit the structured document; and a transmission unit configured to transmit the structured document output by the conversion unit.

5. The generation apparatus according to claim 4, further comprising:
a mapping generation unit configured to generate a mapping that associates properties of an array included in the object with repetitive elements repetition of which is specified in the structured document.

6. The generation apparatus according to claim 1, wherein:
the object tree generation unit is configured to generate a tree structure of the object that includes an array node having individual elements of an array included in the object as its child nodes;
the document tree generation unit is configured to generate a tree structure of the structured document that includes, as repetitive nodes, repetitive elements repetition of which is specified in the structured document; and
the apparatus further comprises a mapping generation unit configured to generate a mapping that associates the array node in the tree structure of the object with the repetitive nodes in the tree structure of the structured document.

7. The generation apparatus according to claim 6, wherein the mapping generation unit is configured to:
generate correspondences between (i) nodes of a tree structure obtained by removing the child nodes of the array node from the tree structure of the object and (ii) nodes of a tree structure obtained by removing child nodes of the repetitive nodes from the tree structure of the structured document, and
generate correspondences between the child nodes of the array node and the child nodes of the repetitive nodes when the array node in the tree structure of the object has been associated with the repetitive nodes in the tree structure of the structured document.

8. The generation apparatus according to claim 1, wherein the mapping generation unit is configured to:
store the correspondence in a history storage unit when having generated a correspondence between one child node and the mandatory node according to description of one part of the program; and
associate the one child node with the mandatory node, and associate another child node with the optional node when the correspondence between the one child node and the mandatory node is stored in the history storage unit according to description of another part of the program.

9. The generation apparatus according to claim 2, wherein:
the calculation unit is configured to:
select, as the minimum edit cost, the edit cost of an edit process that is determined as minimizing the edit cost among at least one edit process for converting the tree structure of the object to the tree structure of the structured document when the tree structure of the object is converted to the tree structure of the structured document by performing, on the tree structure of the object, an edit process in which edit operations are performed at least once; and
calculate total of edit operation costs associated with the respective edit operations as edit cost of the edit process, wherein the edit operations include: renaming the properties, changing sequence of a plurality of child nodes that belong to a common parent node; and adding a parent node for at least one node.

10. A generation apparatus that generates a mapping between individual properties included in an object in a program and individual elements of a structured document, the generation apparatus comprising:
a receiving unit configured to receive a function call with the object as an argument indicating that the object is to be converted to the structured document and the structured document transmitted;
an object tree generation unit configured to generate a tree structure with respect to an array included in the object, said tree structure including, an array node having individual elements of the array as its child nodes that represents hierarchical structure of the object by assigning the individual properties included in the object to nodes of the tree structure;
a document tree generation unit configured to generate a tree structure of the structured document that includes, as repetitive nodes, repetitive elements whose repetition is specified in the structured document from a schema describing hierarchical structure of the structured document;
a mapping generation unit configured to generate a mapping that associates the array node in the tree structure of the object with the repetitive nodes in the tree structure of the structured document;
a selection unit configured to select a mapping minimizing conversion cost of converting the tree structure of the object to the tree structure of the structured document generated by the document tree generation unit, said selection being based on mappings that associate the individual properties included in the object with the individual elements of the structured document;
a conversion unit configured to convert the object to the structured document, which includes values of the individual properties of the object as values of the corresponding elements, said conversion being based on the mapping selected by the selection unit; and
a transmission unit configured to transmit the structured document output by the conversion unit;
wherein the mapping generation unit is configured to generate correspondences between nodes of a tree structure obtained by removing the child nodes of the array node from the tree structure of the object and nodes of a tree structure obtained by removing child nodes of the repetitive nodes from the tree structure of the structured document; and
wherein the mapping generation unit is configured to generate correspondences between the child nodes of the array node and the child nodes of the repetitive nodes when the array node in the tree structure of the object has been associated with the repetitive nodes in the tree structure of the structured document.

11. A non-transitory computer readable article of manufacture tangibly embodying computer readable instructions which, when executed, cause the computer to function as a generation apparatus according to claim 1.

12. A generation method for generating a mapping between individual properties included in an object in a program and individual elements of a structured document, the generation method comprising:
generating a first tree structure representing hierarchical structure of the object by assigning the individual properties included in the object to nodes of the first tree structure;
generating a tree structure of the structured document from a schema describing hierarchical structure of the structured document;

selecting a mapping which minimizes cost of conversion of the first tree structure to a second tree structure which includes the individual elements of the structured document as its nodes; and preferentially associating the child nodes in the tree structure of the object with the mandatory node (i) when a parent node on a side of the object, that includes child nodes in the tree structure of the object is associated with a parent node and (ii) on a side of the structured document that includes the optional nodes and the mandatory nodes in the tree structure of the structured document;

wherein a mapping minimizing conversion cost of converting the tree structure of the object to the tree structure of the structured document generated by the document tree generation unit is selected;

wherein a tree structure of the structured document that includes an optional element designated optional as an optional node and a mandatory element designated required as a mandatory node is generated; and wherein the selecting is from mappings that associate the individual properties included in the object with the individual elements of the structured document.

13. A non-transitory computer readable article of manufacture tangibly embodying computer readable instructions which, when executed, cause the computer to carry out the steps of a method according to claim 12.

* * * * *